May 7, 1963
R. D. CLARK
3,088,592
CONTROL SYSTEM
Filed March 20, 1961
2 Sheets-Sheet 1
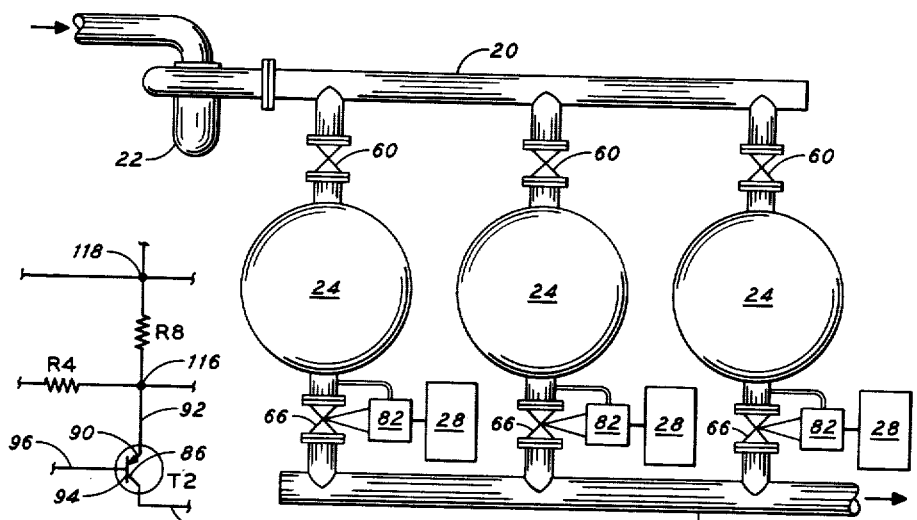
FIG. 3
FIG. 1
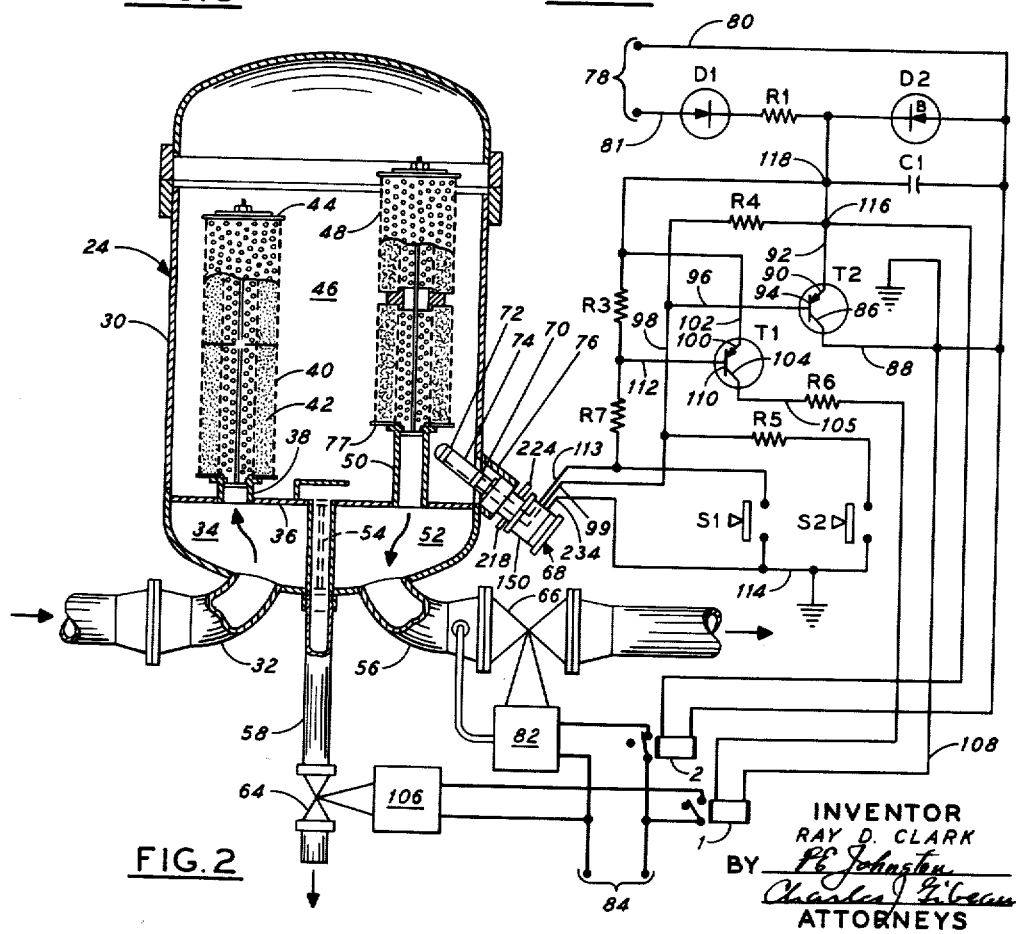
FIG. 2
INVENTOR
RAY D. CLARK
BY
ATTORNEYS

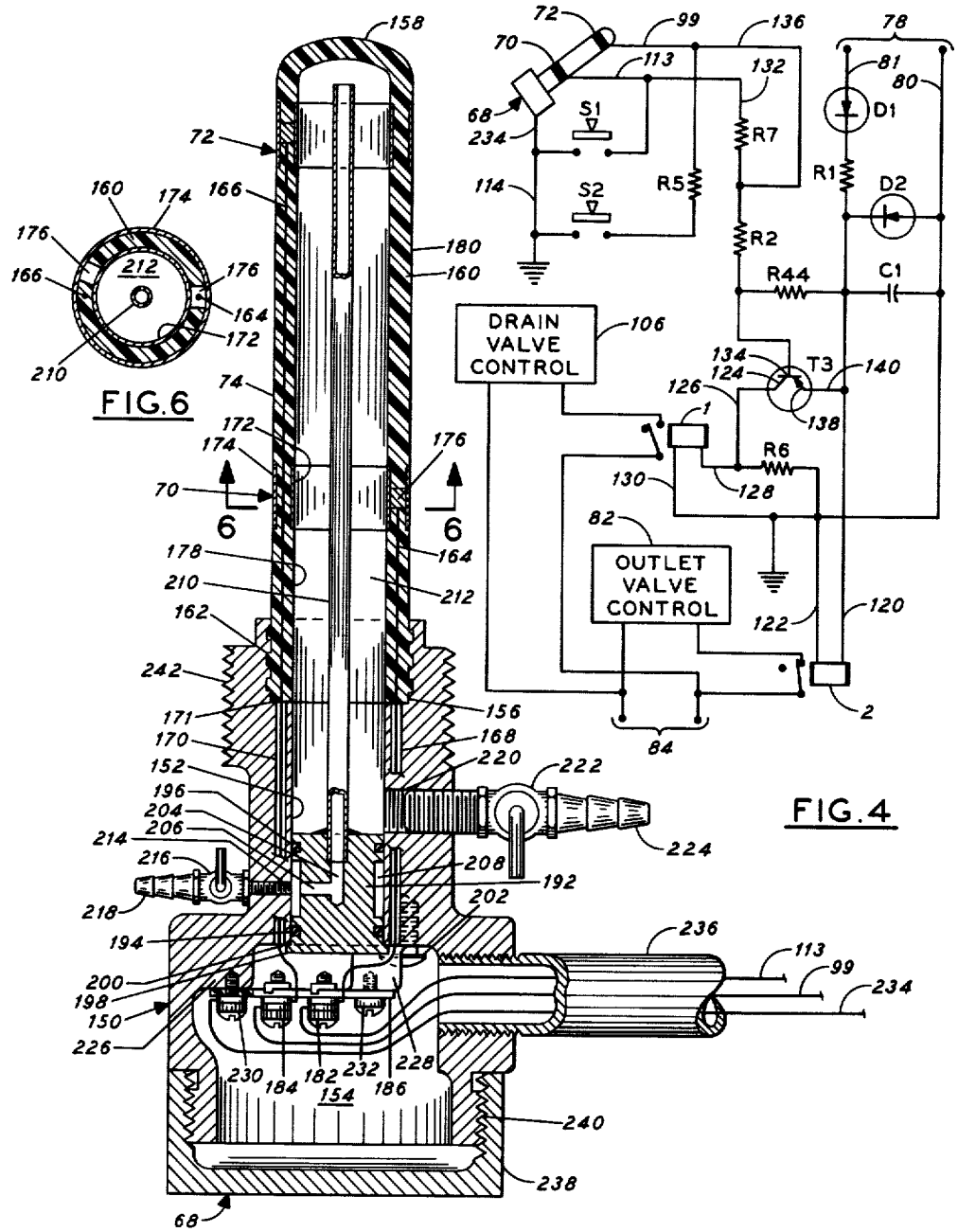

ered by the unit 24, are connected in parallel relationship between the conduit 20 and a second conduit 26 from which the water-free or dry fuel is dispensed to the aircraft.
United States Patent Office 3,088,592
Patented May 7, 1963

3,088,592
CONTROL SYSTEM
Ray D. Clark, Oakland, Calif., assignor to California Research Corporation, San Francisco, Calif., a corporation of Delaware
Filed Mar. 20, 1961, Ser. No. 96,882
6 Claims. (Cl. 210—114)

This invention is directed to means for controlling the operation of apparatus used to separate the intermixed components of fluid streams, and more particularly to means for controlling the operation of water-separating units incorporated in a system for treating a stream of hydrocarbons.

One application of the invention resides in processes for separating water from a petroleum product wherein settling or separating tanks are used, which tanks may sometimes contain devices to coalesce the water droplets and cause them to be precipitated to the bottom of the tank, where they will remain separated by gravity from the body of the petroleum product in which they previously were entrained. In some operations, it is imperative that the petroleum product issuing from the process be substantially entirely free of water. In these circumstances, special care must be taken to control the operation of the water-separating apparatus to assure that quantities of separated water will not be reintroduced into the product stream issuing from the treating process.

The present invention has a particular application in a system for controlling the operation of apparatus for separating intermixed water from a stream of hydrocarbon fuel, such as in a fueling system for aircraft. It will be appreciated that a fuel for this purpose must be substantially free of water to prevent malfunctioning of the aircraft, and precautions are taken to remove any water which may have become intermixed with the fuel during storage or prior thereto.

The apparatus for removing the intermixed water may comprise a plurality of water-separating units connected in parallel relationship between a first manifold conduit into which the fuel is pumped from storage and a second manifold conduit which receives the fuel from the water-separating units for delivery to the aircraft. Each water-separating unit may comprise a tank designed to work under pressure and which may receive a stream of intermixed fuel and water through an inlet conduit from which it is directed through a coalescing material which accumulates the entrained water into large droplets which precipitate to the bottom of the tank. The dry oil passes through a filter material to an outlet conduit. The outlet conduit for each of the water-separating units is connected to a common manifold from which the dry fuel is delivered to the aircraft.

As the entrained water is separated from the fuel, it collects in the bottom of the water-separating unit on a collector plate. A valve-controlled drain is provided through which the separated water can periodically be removed.

It is desirable to remove the separated water before it accumulates in a sufficient amount to interfere with the operation of the filter material and present the possibility of being carried through the filter material and reintroduced into the fuel stream. If the circumstance arises where the draining apparatus malfunctions or does not have the capacity to remove the separated water at a sufficient rate to prevent it from rising above a predetermined level in the water-separating unit, then it is desirable to take the affected unit off stream and place it in condition to function properly. By placing a plurality of water-separating units in parallel, it is possible to interrupt the operation of one of them without stopping the delivery of fuel to the aircraft.

The present invention provides a novel, automatic control activated by an electrical sensing device, which control will operate to drain a water-separating unit when the separated water reaches a predetermined level, and to take the unit off stream when the level of separated water reaches a second predetermined level. In one modification of the invention the control device operates the pertinent valves associated with the water-separating unit until the level of the separated water is brought within the desired working range, after which the unit automatically is placed on stream. In another modification, primarily for use where particular safety precautions must be observed, the control device operates to take the water-separating unit off stream until such time as it is inspected and reactivated by manual operation.

Although the separation of water from a stream of fuel oil has been mentioned and will be described as an example of a process in which the apparatus of the present invention can be employed, it will be appreciated, as the description of the invention proceeds hereinafter, that it has utility in other processes where electrolytes other than water are separated from carrier streams other than fuel oil.

It is an object of this invention to provide a novel means for controlling the operation of apparatus in which an entrained electrolyte is separated from a stream of non-electrically conducting material.

Another object of this invention is to provide a novel electrical circuit for controlling the operation of a device which separates entrained water from a stream of hydrocarbon liquid.

Still another object of this invention is to provide an electrical control circuit which includes a sensing probe, the functioning of which can be tested under conditions simulating actual operation to assure that the system is functioning properly.

These and other objects will become apparent as the description of the invention proceeds in conjunction with the accompanying drawings which form part of this application.

In the drawings:
FIG. 1 represents a schematic illustration of a fueling system embodying the present invention.
FIG. 2 illustrates in sectional elevation a water-separating unit employed in the systems of FIG. 1 and shows schematically a control circuit in accordance with the present invention applied thereto.
FIG. 3 shows a modification of a portion of the circuit illustrated in FIG. 2.
FIG. 4 is a schematic representation of another modification of a control circuit embodying this invention.
FIG. 5 illustrates in elevation and partly in section an electrode-carrying probe which may be used with this invention.
FIG. 6 is a plan view taken along the line 6—6 of FIG. 5.

The fueling system illustrated in FIG. 1 comprises a manifold conduit 20 which receives a supply of fuel containing entrained water from a supply source, not shown, through pump 22. A plurality of similar water-separating units, as illustrated by the unit 24, are connected in parallel relationship between the conduit 20 and a second conduit 26 from which the water-free or dry fuel is dispensed to the aircraft.

The operation of each water-separating unit is controlled by the apparatus of this invention, represented schematically by the auxiliary unit 28, in a manner to be explained hereinafter.

FIG. 2 illustrates in more detail an exemplary embodiment of one of the similar water-separating units 24 and the manner in which the present invention is applied thereto. The water-separating unit is an article familiar to the art. It may comprise a pressure vessel 30 having an inlet 32 which receives a mixture of fuel and entrained water from supply conduit 20. The mixture flows into a chamber 34 within the vessel below the fluid-tight collection plate 36 and thence through a nipple 38 through the collector plate to the interior of a hollow cartridge 40 which is made with a wall of a porous material 42, such as treated glass fibers. The cartridge is closed at the top by a closure member 44, and the mixture of fuel and water is forced to flow through the porous walls of the cartridge and into the interior chamber 46 of the vessel. As it does so, the entrained water is coalesced into particles of larger size which become separated by gravity from the carrier oil and sink to the collector bottom plate 36 at the bottom of the vessel. The water-free oil is forced through a filter cartridge 48 and flows through the nipple 50 into the chamber 52 below the collector plate and separated from chamber 34 by a fluid-tight wall 54, and thence through the outlet conduit 56 which communicates with the manifold 26.

The nipple 50 holds the filter cartridge 48 spaced above the collector plate 36 a distance which permits a predetermined quantity of water to collect above the collector plate before contacting the filter cartridge. A drain conduit 58 is set into the collector plate to enable the collected water to be drained out of the unit.

The inlet conduit to the water-separating unit is controlled by a manually operated valve 60 to permit the unit to be taken off the line for repair or replacement. The drain conduit is controlled by an electrically actuated valve 64 which is operated automatically in accordance with the quantity of water accumulated above collector plate 36 to open and permit the collected water to drain away or to close, through a sequence of operations and in a manner to be described more fully hereinafter.

The outlet conduit 56 is controlled by an electrically actuated valve 66 which will be operated automatically in accordance with the level of water above the collector plate 36 to close the outlet conduit and prevent the contents of the water-separating unit from flowing to the manifold 26 and which will be opened when the water condition has been corrected to again place the water-separating unit on stream, in a manner to be described more fully hereinafter.

The apparatus of this invention employs an electrode-carrying probe 68, indicated in FIG. 2 and shown in more detail in FIG. 5, on which the electrodes 70 and 72 are mounted in spaced-apart relationship on a support 74 of electrical insulating material. In the particular embodiment of the invention illustrated, the electrode-carrying portion 74 of the probe is inserted into the interior chamber 46 of the water-separating unit through a fitting 76 into which the probe is screwed in water-tight relationship to position the lower or first-stage electrode 70 at a predetermined level above the collector plate 36 and the upper or second stage electrode 72 at a higher level but below the bottom 77 of the filter cartridge 48. The electrodes are components of an electrical circuit which controls the operation of the drain valve 64 and the outlet valve 66 as the circuit is completed or broken by water in the water-separating unit contacting or receding from the electrodes. The water completes the circuit from the electrode to the metal wall of the water-separating unit to which the circuit is grounded.

In the modification of the circuit illustrated in FIG. 2 a power supply, indicated by the numeral 78, is connected between a ground line 80 and the positive or hot conductor 81. The control circuit may be used with either an A.C. or a D.C. supply. When an A.C. supply is used, conductor 81 is connected to a diode rectifier D1. When a D.C. supply is used, this diode is not required. A dropping resistor R1 is connected in series with the diode D1, and a voltage control diode D2, such as a zener diode, is connected between resistor R1 and the ground line 80.

Filtering capacitor C1 is connected in the circuit in parallel with diode D2 to smooth out variations in current resulting either from an A.C. power supply or from an unfiltered D.C. supply.

A relay 2 is connected in parallel with capacitor C1. This relay controls the operating device 82 for outlet valve 66 by connecting and disconnecting a source of power 84 to it. The manner of constructing a valve for this purpose is known to the art, and hence a detailed explanation of the valve mechanism and the manner in which a relay controls its operation is not believed necessary for a clear understanding of the present invention.

Transistor T2 is connected in parallel with capacitor C1 and with the collector 86 of the transistor connected to ground line 80 through conductor 88 and the emitter 90 connected to the positive side of the circuit through the conductor 92. The base 94 of the transistor is connected through the conductors 96, 98 and 99 with the second-stage electrode 72, and a biasing resistor R4 is connected in the circuit between the base conductor 96 and the emitter conductor 92. A second transistor T1 is connected in parallel with transistor T2 and with its emitter 100 connected through the conductor 102 with the positive side of the circuit. The collector 104 of transistor T1 is connected through conductor 105 and loading resistor R6 with a relay 1 which controls the operation of drain valve 64 through the control device 106. The circuit through the relay is completed to ground through conductor 108. The base 110 of transistor T1 is connected by conductor 112 through a stage separation resistor R7, and conductor 113 to the first-stage electrode 70, and a biasing resistor R3 is connected between the base conductor 112 and the emitter conductor 102.

Switches S1 and S2 are placed in the circuits respectively of first-stage electrode 70 and the second-stage electrode 72 to complete a circuit from the grounded line 114 to the base of the respective transistors T1 and T2. These switches, with switch S2 connected through a test resistor R5 to the base of transistor T2 and switch S1 connected through the stage separation resistor R7 to the base of transistor T1, permit a signal to be imposed on the base of each transistor comparable to the signal which would result if the complementary respective electrodes 70 and 72 associated with the switch circuits were contacted by water. The switches, therefore, enable a test to be made of the operability of the circuit.

A description of the operation of the apparatus follows. For the purpose of this description it will be assumed that the power supply 78 is a source of 115 volts A.C. However, it will be appreciated that the circuit can be balanced to operate for other values of voltage from an A.C. source, or as mentioned heretofore a D.C. source of power may be used.

The alternating current is rectified by diode D1, and resistor R1 and capacitor C1 function as a filter circuit to smooth out the rectified current. Resistor R1 functions also as a voltage-dropping resistor and has a normal input of 64 volts from diode D1. Voltage control diode D2 has a breakdown rating of 24 volts. The resistor R1 is selected to conduct approximately 13 milliamperes, of which 3 milliamperes flow through the diode D2 and 10 milliamperes are available at relay 2 during normal operation.

Relay 2 is connected in parallel across the power supply and is adjusted to engage its contacts when the current flow across it is in the range of 6 to 7 milliamperes and to open its contacts when the current flow drops to approximately 3 milliamperes. Transistor T2 is connected in parallel with relay 2. When this transistor is conducting, the increased transistor current in conjunction with the voltage-dropping resistor R1 reduces the voltage at relay 2 below the amount necessary to hold it energized, and the relay becomes de-energized. As mentioned heretofore, relay 2 controls the operation of the outlet valve 66. When relay 2 is energized the outlet valve is held open, and the dry fuel from the water-separating unit 24 flows to the manifold 26. When relay 2 is de-energized, the outlet valve 66 closes and prevents the contents of the water-separating unit from flowing to the manifold 26.

The base 94 of transistor T2 is connected to the uppermost or second-stage electrode 72 of the probe 68. Thus when the level of collected water in the water-separating unit reaches this electrode, transistor T2 is activated to pass a current which causes relay 2 to be de-energized and the outlet valve 66 to close as explained heretofore. Resistor R4 establishes a bias on transistor T2 which reduces the effect of a thermal current flow which could cause the transistor to become conducting and cause a malfunction of the control apparatus when the transistor is exposed to high temperatures. It will be noted, however, that a false signal due to thermal currents will cause the outlet valve 66 to close and take the water-separating unit off the line. Hence with this circuit, such a malfunction operates in a "fail-safe" direction.

The base 110 of transistor T1 is connected to the lowermost or first-stage electrode 70 of probe 68 through the stage-separation resistor R7. This resistor reduces the signal current flowing from the electrode to the transistor to prevent conduction through the transistor T1 in an amount substantially in excess of 3 milliamperes, which is required to energize relay 1.

Relay 1 is connected in series with the collector of transistor T1 through loading resistor R6, and thus, when the transistor is not conducting, relay 1 is de-energized. This relay controls the operation of drain valve 64. When the relay is de-energized, the drain valve is closed, and when the relay is energized the drain valve is opened.

Biasing resistor R3 is connected between the plate and the emitter of transistor T1 to improve the thermal stability of this transistor at high ambient temperatures. The resistors R3 and R4 are selected to cause transistor T2 to pass a current at high ambient temperatures prior to the time transistor T1 would likewise pass a current. By this means, if the circuit malfunctions when exposed to high temperatures, the outlet valve 66 will close and the water-separating unit taken off the line before relay 1 can be energized to open the drain valve. Otherwise, it would be possible for the drain valve to open because of excess thermal currents at transistor T1 and permit some of the contents of the water-separating unit to be diverted to drain while the remainder passed to the dispensing manifold 26. Therefore, malfunctioning of the circuit due to high ambient temperatures closes down the water-separating unit in a fail-safe operation.

During normal operation of the circuit illustrated in FIG. 2, when the level of the collected water reaches the first stage electrode 70, the resultant signal on transistor T1 causes it to conduct a current which energizes relay 1 to open the drain valve 64. The collected water then drains from the water-separating unit until it recedes from contact with electrode 70, at which time the signal circuit to transistor T1 is broken and the transistor stops conducting. Thus relay 1 is de-energized and the drain valve closes.

If the amount of water being separated from the fuel oil is in excess of that which the drain valve can handle, the level of collected water will rise until the second-stage electrode 72 is immersed. At this time the signal circuit is completed to transistor T2 which then becomes conducting, and relay 2 is de-energized, causing outlet valve 66 to close, thus preventing the contents of the water-separating unit from passing to the dispensing manifold 26. Under these conditions, with transistor T2 conducting, the voltage at diode D2 is reduced below its breakdown voltage to a value of approximately five volts, and diode D2 ceases conducting. The current passing through transistor T2 reduces the available circuit voltage at transistor T1 to approximately five volts, and the current passing through transistor T1 and relay 1 under these conditions is about 0.4 milliampere. This current is not sufficient to cause relay 1 to maintain the drain valve open. Hence, when the outlet valve 66 closes because of the high level of collected water, drain valve 64 also closes, even though first-stage electrode 70 remains immersed in the collected water. Therefore, the water-separating unit 24 is isolated from the system until such time as the conditions which caused the unit to be taken off stream can be corrected. This operation of the circuit is desirable in some situations where, either because of the nature of the fuels being handled or because of the construction of the surface facilities into which the drainage from the water-separating unit is diverted, it is desirable to take the unit off stream under conditions where excess water is collected in it, to permit a manual inspection and adjustment of the apparatus to assure its proper functioning before it again is placed in operation.

On some systems it is desirable to hold the drain valve open when the outlet valve 66 is closed, to permit the excess water to continue to drain out of the water-separating unit until the collected water is at a desirable working level, at which time the outlet valve will open automatically and the water-separating unit go back on stream.

This may be done by increasing the current and voltage rating of diode D2 to hold the voltage in the remainder of the circuit at a higher level than has been previously described, and by reducing the value of resistor R1 while placing an additional resistor R8 in the circuit between the contacts 116 and 118 to reduce the circuit voltage on the emitter of transistor T2 as shown in the portion of the circuit illustrated in FIG. 3, which circuit corresponds in other respects to the circuit illustrated in FIG. 2. Under these conditions, a higher voltage will be established at transistor T1 while transistor T2 is conducting, and relay R1 will remain energized to hold the drain valve 64 open while the outlet valve 66 is closed. Thus, the collected water will be enabled to drain out of the water-separating unit until the second-stage electrode 72 is no longer immersed in the water, at which time the signal circuit to transistor T2 will be broken and outlet valve 66 will open to place the water-separating unit back on stream. The drain valve 64 remains open until the level of the collected water recedes from contact with first-stage electrode 70, at which time the signal circuit to transistor T1 is broken and the drain valve closes. Thus, the water-separating unit will be controlled automatically in accordance with the level of the separated water collecting in it to be taken off stream or put on stream and to drain and stop draining as the water-separating function of the unit requires.

In some installations a single water-separating unit is used between the supply manifold and the dispensing manifold instead of the plurality of water-separating units illustrated in FIG. 1. In such installations the supply pump discharges through the single water-separating unit, and when this unit malfunctions the whole system must be closed down. For such installations it sometimes is desirable to stop the supply pump when the water-separating unit malfunctions. This invention can be applied to such an installation by connecting relay 2 to the control switch for the pump motor rather than to the outlet valve control and causing the motor to stop or start in accordance with the condition of the water collected within the water-separating unit as described heretofore.

Another embodiment of the control circuit of the present invention is illustrated in FIG. 4 wherein like numerals and symbols will be used to designate elements which are comparable in form and function to those described heretofore.

Assuming again that the 115-volt A.C. power supply 78 is used, the rectifying diode D1, the voltage control diode D2, and the filtering circuit including the resistor R1 and the capacitor C1 will be employed as described heretofore. The rectified and filtered power supply to the remainder of the circuit will have then a 24-volt potential.

In the present embodiment of the circuit a single transistor T3 is used to control the operation of both the outlet valve and drain valve. Relay 2 is connected across the circuit in parallel to the power supply by means of conductor 120, which connects with the positive line 81, and conductor 122, which connects with ground line 80. Relay 1 is connected in series between the collector 124 of transistor T3, through conductors 126 and 128, and ground, through conductor 130.

The first-stage electrode 70 of probe 68 is connected by conductors 113 and 132 through stage-separation resistor R7 and buffer resistor R2 with the base 134 of transistor T3. The second-stage electrode 72 also is connected with the base 134 of transistor T3 through conductors 99 and 136 and resistor R2 but by-passes resistor R7. The buffer resistor R2 is a current-limiting resistor which prevents excessive transistor current flow if the probe electrodes should be grounded accidentally.

Biasing resistor R44 is connected between the base and the emitter of the transistor to improve its thermal stability as explained heretofore with respect to the previously described circuit. A by-pass resistor R6 is connected in parallel with relay 1 between the collector 124 of transistor T3 and ground to provide a path for the transistor current and assure the operation of relay 2 should the coil circuit of relay 1 open or otherwise become unable to pass the transistor current. Conductor 120 from relay 2 is connected to the emitter 138 of transistor T3 by conductor 140.

Switches S1 and S2 are placed respectively in the circuits of the first-stage electrode 70 and the second-stage electrode 72 with switch S1 completing a circuit from ground through stage-separation resistor R7 and switch S2 completing a circuit from ground through loading resistor R5 to impress a signal on the base 134 of transistor T3 comparable to the signal generated when the corresponding electrode is immersed in the collected water. These switches enable the operation of the circuits associated with the electrodes to be tested but do not test the proper functioning of the probe electrodes as such.

As in the circuit previously described, relay 1 normally will be actuated by a current flow of approximately three milliamperes and will be de-energized or drop-out when the current flow is reduced to 1.5 milliamperes. When the first-stage electrode is immersed in water the current flowing from it to the base of the transistor is reduced by resistor R7 to an amount which will prevent the transistor from conducting a current substantially in excess of the three milliamperes required to energize relay 1. At this time the current flowing through relay 2 is reduced from the initial current of about 10 milliamperes to about 7 milliamperes but is still adequate to maintain relay 2 energized.

As explained heretofore, relay 1 controls the operation of drain valve 64 and relay 2 controls the operation of outlet valve 66. In normal operations of the apparatus there is no current flowing through transistor T3, and relay 1 is de-energized, under which condition the drain valve 64 is closed. However, since relay 2 is connected across the power source it is energized in its normal condition of operation and the outlet valve 66 which it controls is held open.

When the first-stage electrode 70 is immersed in water a signal is imposed on the base of transistor T3 which causes the transistor to pass a current. Thus relay 1 is energized and the drain valve 64 opens to drain the accumulated water from the water-separating unit while the outlet valve 66 remains open, permitting the dry fuel to flow to the dispensing manifold 26. Should the collected water continue to rise in the water-separating unit, the second-stage electrode 72 becomes immersed and an additional signal is imposed on the base of transistor T3 which results in a greater current flow through the transistor. This current flows partly through relay 1 and partly through resistor R6 so that relay 1 remains energized to hold the drain valve open. However, the current flow through the transistor is now great enough to reduce the current flow through relay 2 to approximately 1 or 2 milliamperes. Relay 2 is adjusted to become de-energized at this current flow and hence it drops out, causing the outlet valve 66 to close. Relay 1 remains energized and the drain valve 64 remains open.

As the water recedes from contact with second-stage electrode 72, the additional signal imposed by this electrode circuit on the base of the transistor ceases and the current through the transistor is reduced to that resulting from a signal imposed by the first-stage electrode 70. Additional current again flows through relay 2, which is energized to open the outlet valve 66. However, the drain valve remains open until sufficient water drains from the water-separating unit to break contact with and open the circuit at the first-stage electrode. At this time the drain valve closes. Thus, this embodiment of the invention provides a fully automatic control circuit which will open and close the drain valve and the outlet valve, and take the water-separating unit off stream or place it on stream in the sequence of operations required for the proper functioning of the apparatus.

FIG. 5 illustrates in greater detail the structure of an electrode-carrying probe which may be used with this invention. In the exemplary embodiment illustrated, the probe 68 comprises a metal base portion 150 to which is affixed, in fluid-tight relationship, an extending electrode-supporting portion 74 made of electrically insulating material. The base portion is formed with a bore 152 extending axially through it and communicating at one end with the enlarged chamber 154. The other end of the bore is enlarged by a counter bore 156 to receive one end of the extension 74 in fluid-tight relationship.

The extending portion 74 is made in the form of a hollow cylinder having an internal diameter equal to that of the bore 152 and closed at its free end by the end wall 158. The cylinder may be made by placing a core or mandrel through the bore 152 to extend the length of the cylindrical projection 74, and placing a mold around the mandrel with a radial clearance between the mandrel and the mold equal to the thickness of the wall 160 of the cylinder. A fluid resin is poured between the mandrel and the mold and flows into the counter-bored portion 156, which may have serrations 162 formed in it to firmly anchor the projection 74 to the base 150. When the resin has set, the mold and mandrel are withdrawn.

Prior to casting the resin, the two axially spaced-apart electrodes 70 and 72 are positioned in the space between the mandrel and the mold, and respective electrical conductors 164 and 166 are secured in electrical contact at one end to the electrodes and then threaded through complementary passages 168 and 170 formed axially through the base portion parallel to the bore 152 and extending from the chamber 154 to the radial shoulder 171 which forms the base of the counter-bored portion 156. The electrodes 70 and 72 are designed to be exposed to contact by water at both the outer and inner circumferential surfaces of the cylindrical projection 74.

Each electrode 70 and 72 may be constructed with a pair of metallic rings 172 and 174 separated by metallic spacer elements 176, to which the rings are secured in the electrical contact to dispose the ring 172 flush with the inner surface 178 of the projection 74 and the ring 174 flush with the exterior surface 180. When casting the probe extension 74, the fluid resin flows between the rings 172 and 174 and around the spacer elements 176 and interlocks the electrode assemblies and the respective electrical conductors 164 and 166 connected to them and within the material of which the probe extension is made. This structure produces a unit which will withstand hard usage without danger of physical damage which would result in faulty electrical connections. Although many materials, ranging from ceramics through plastics and rubbers, may be used for the probe extension, an epoxy resin has been found particularly suitable for probe units employed in apparatus wherein water is separated from fuel oil.

The conductors 164 and 166 from the respective electrode assemblies 70 and 72 are electrically connected to the respective terminals 182 and 184 on the terminal block 186 secured within the chamber 154 of the base portion 150. Respective conductor leads 113 and 99 are attached to the appropriate terminals for connecting the electrodes in the circuits described heretofore.

The open lower end of the bore 152 is closed by a closure plug 192 into the periphery of which O rings 194 and 196 have been inserted to form a fluid-tight seal between the closure plug and the inner wall of the bore. The closure plug has a radially enlarged head portion 198 which bears against the shoulder 200 at the end of the bore 152, and is held firmly in place against the shoulder within the bore by the screw 202.

The closure plug is formed with a central hole 204 extending partially through its axis and communicating with a radial passage 206, which in turn communicates with the peripheral channel 208 formed on the outer circumference of the plug. A metal tube 210 is secured at one end in the hole 204 with the interior of the tube communicating with the hole. Preferably, the tube is welded or soldered to the plug to provide a mechanically strong attachment of good electrical conductivity between the two parts.

When the plug 192 is secured in place, the interior of the probe extension 74, together with the bore 152, forms a chamber 212 from which fluids are excluded except through the valve passages to be described hereinafter. The tube 210 extends within the chamber in coaxial alignment with the probe extension 74 to above the location of the topmost electrode 72. The free end of the tube is open and the interior of the tube communicates with the chamber 212.

The base 150 has a radial passage 214 formed through it in alignment with the circumferential channel 208 of the closure plug. A valve 216 is secured to the radial passage 214, and a serrated nipple 218, or other form of connector, may be secured to the valve to provide a connection for a flexible tube, not shown. A second radial passage 220 is formed through the base 150 to provide a communicating conduit from the exterior of the base to the chamber 212. A valve 222 is secured to this passage, and a separable connector, such as a serrated nipple 224, is secured to the valve.

The terminal block 186 is secured to bosses 226 and 228 within the chamber 154 of the base portion by respective screws 230 and 232, the former of which acts as a ground connection to the base portion for the electrical conductor 234. The conductors 113, 99 and 234 are electrically insulated from each other and are threaded through a conduit 236 and thence appropriately connected to the control circuit as described heretofore. A closure member 238 is detachably affixed to the base member, as by screw threads 240, to seal the chamber 154 and keep it clean and dry while permitting access to the terminal block 186.

Screw threads 242 are formed on a peripheral surface of the base portion to enable the probe to be connected to an appropriate fitting, as the fitting 76 of FIG. 2, in the water-separating unit 24.

As explained heretofore, the switches S1 and S2 are included in the control circuit to permit the operation of the components to be tested by completing the circuits to ground through the switch to impose a signal on the base of the appropriate transistor. The switch circuit bypasses the electrode-carrying probe and does not depend on the probe for creating or transmitting the test signal. Hence it is possible that, while the test switch indicates an operable circuit, the probe can be malfunctioning and unable to generate the appropriate signals for the proper control of the water-separating unit.

For instance, by way of example, if the electrical connection between the topmost electrode 72 and the control circuit is broken within the probe, no signal will be transmitted from the electrode to close the outlet valve 66 to take the water-separating unit off the line when this electrode becomes immersed in water, even though closing switch S2 will create a signal indicating that the circuit is operating. Should such a malfunction occur, it would be possible for the water collecting in the bottom of the water-separating unit to reach a level at which it would pass through the filter cartridge 48 and into the dispensing manifold 26 with no indication that the fuel being dispensed to the aircraft contained water. A feature of the apparatus of the present invention is an arrangement which permits testing of the operability of each electrode in the circuit.

In testing the electrodes, a source of water or other electrolyte similar to the electrolyte to which the probe will be exposed during normal operation is introduced into the chamber 212 through the opened valve 222 and passage 220. When the probe extension 74 is made of an opaque substance, or when the probe is installed in a vessel and is not visible, a measured amount of electrolyte is introduced into the chamber 212 sufficient to contact and partly immerse the first-stage electrode 70. The air trapped within the probe extension escapes through the tube 210 and the valve 216, the latter being opened for this function. The electrolyte within the chamber 212 completes an electrically conducting circuit between the inner ring 172 of electrode 70 and the metal tube 210, which is in electrical contact with the base 150 of the probe and hence is grounded to the metal portions of the water-separating unit in which the probe is installed and the piping connected thereto. Thus the control circuit is energized to operate the drain valve 64 in the same manner as it would as the result of a signal generated by an electrolyte contacting the outer ring 174 of the electrode 70 and completing a conducting path between the electrode and the metal walls of the water-separating unit in which the probe is installed.

When the probe extension 74 is made of a transparent or translucent substance, as an epoxy resin, and when the probe extension is visible, then the amount of electrolyte placed within the chamber 212 can be controlled by visual observation to introduce into the chamber a sufficient amount to contact the appropriate electrode. In either circumstance, sufficient electrolyte is placed within the chamber 212 to contact in turn each of the electrode stages to test the proper functioning of the electrodes and the control circuit connected to them. Also, the electrolyte is withdrawn from the chamber 212 through the passage 220 and the opened valve 222 to test in turn the operation of each electrode and the associated circuit as the level of the electrolyte recedes from contact with the electrode.

In some installations, it will be preferable to install the probe in a position inverted to that shown in FIG. 5, with the wiring at the terminal block 186 arranged so that the signal from the appropriate electrode operates the proper valve of the apparatus. When the probe is to be tested in this inverted position, preferably the electrolyte is introduced into chamber 212 through the passage 206 and the tube 210 to what will then be the lowermost part of the probe, and the air escapes through the passage 220 and opened valve 222.

The base 150 of the probe, and hence the tube 210, is connected to ground conductor 234 as described heretofore to permit the probe to be tested on a workbench or test stand where it is not grounded by metallic contact with the remainder of the apparatus. Under these conditions the conductor 234 is connected to the grounded line 114 of the circuit described heretofore, hence providing an electrical connection from the electrodes 70 and 72 through an electrolyte within the chamber 212 through the tube 210 to ground. It will be appreciated that test lamps or meters can, for test purposes, be placed in the circuit in place of the valves 64 and 66, and in some installations it will be desirable to place warning lights or other alarms in the operating circuit to indicate the position of each of the controlled valves.

It will be apparent from the foregoing description of this invention that it attains the objects for which it is designed and provides a novel control system, the operability of which can be tested in a manner simulating actual operating conditions and which prevents any malfunctioning of the system from producing a hazardous condition in the controlled apparatus, or from wasting the product being handled.

I claim:

1. In a system for controlling the operation of apparatus for separating intermixed water from a stream of hydrocarbon fuel and wherein a plurality of water-separating units are connected in parallel relationship between a first manifold conduit supplying a mixture of fuel oil and water to said separating units and a second manifold conduit for hydrocarbon fuel into which said separator units discharge, a water-separating unit comprising a tank, means in said tank for separating admixed water from said hydrocarbon fuel and collecting said water in the bottom portion of said tank, an inlet conduit and an outlet conduit and a drain conduit for said tank, respective electrically actuated valves in said outlet conduit and in said drain conduit, vertically spaced-apart electrodes within said tank and spaced apart from the inner walls thereof, an electrical circuit which includes as electrical conductors the walls of said tank and said electrodes and a body of water in contact with said walls of said tank and said electrodes, said electrical circuit comprising a power supply for said circuit, means controlling the voltage and current of said power supply to said circuit within predetermined maximum limits, a first and a second current amplifying means connected in parallel across said circuit, a first relay means connected in series with said first current amplifying means, a second relay means connected in parallel with said first and said second current amplifying means, means electrically connecting the lower one of said electrodes to said first current amplifying means to activate said first current amplifying means by a signal from said lower electrode to pass a current when said lower electrode is contacted by water, means for electrically connecting said first current amplifying means and said first relay means to energize said first relay means by the current passed by said first current amplifying means, means electrically connecting said first relay means and the electrically actuated valve in said drain conduit to open said valve when said first relay means is energized, means electrically connecting said second relay means and the electrically actuated valve in said outlet conduit to open said valve in said outlet conduit when said second relay means is energized, means electrically connecting the upper one of said electrodes to said second amplifying means to activate said second current amplifying means by a signal from said upper electrode to pass a current when said upper electrode is contacted by water, said second relay means being constructed to be energized by said power supply to hold the valve open in said outlet conduit when said second current amplifying means is not activated by a signal from said second electrode and to be de-energized when said second current amplifying means passes a current upon a signal from said upper electrode and to close the valve in said outlet conduit.

2. A system in accordance with claim 1 wherein said first relay means is constructed to be de-energized when the current passed by said first current amplifying means falls below a predetermined amount, and said second current amplifying means is constructed to pass a sufficient current across said circuit when activated by a signal from said second electrode to drop the amount of current passing through said first current amplifying means below the predetermined amount required to energize said first relay means, and said circuit operates to close said valve in said drain conduit when said circuit operates to close said valve in said outlet conduit.

3. A system in accordance with claim 1 wherein said electrical circuit is a direct current circuit and wherein said first and second current amplifying means are transistors having respective base, emitter and collector components, and wherein said lower one of said electrodes is connected to the base component of the first transistor and said relay is connected to the collector component of said first transistor and wherein said upper one of said electrodes is connected to the base component of the second transistor.

4. A control circuit for controlling the operation of apparatus in accordance with a variation in a condition of a body of material contained in said apparatus comprising a source of power connected to a circuit, means limiting the voltage and current in said circuit to an amount below a predetermined maximum, transistor means having emitter, collector, and base components and connected in said circuit to transmit a current through said emitter and said collector components across said circuit in an amount in accordance with a signal imposed on said base component, a first relay means connected to said transistor means and normally energized when said transistor means is passing a current, a second relay means connected across said circuit and normally energized by said source of power and de-energized when said transistor means is passing a current above a predetermined amount, means producing electrical signals in accordance with the variations of a condition of a body of material contained in an apparatus, means for imposing said signals on said base component of said transistor means, and means connecting said first relay means and said second relay means with respective control means which control the operation of said apparatus, said circuit controlling the operation of said apparatus in a predetermined manner in accordance with said signals produced by said variation.

5. An electrical circuit for controlling the operation of a plurality of valves in apparatus for separating water from fuel oil comprising a container wherein water is separated from a body of fuel oil and wherein said water is collected in the bottom of said container, a a plurality of vertically spaced-apart electrodes located in the bottom portion of said container and exposed to contact by said water, an electrical circuit including said electrodes and a source of power, a transistor means having a base and an emitter and a collector, means electrically connecting said electrodes to the base of said transistor means to impose a signal on said base, a resistor connected between the lower one of said electrodes and said base to limit below a predetermined amount the signal imposed on said base by said lower electrode, a first relay connected to said collector and to one side of said circuit, said emitter connected to the other side of said circuit, a second relay connected across said circuit in parallel with said transistor means, said second relay being selected to be energized by a current above a predetermined amount in said circuit and to be de-energized when the current in said circuit falls below a predetermined amount, said first relay being selected to be energized by a current passed by said transistor means when said transistor means is activated by a signal received from said lower electrode, said second relay being selected to remain energized by the current in said circuit when said transistor means is activated to pass a current by a signal from said lower electrode and to be de-energized when said transistor means is additionally activated to pass additional current by a signal from the upper electrode, means connecting said first relay to a drain valve for said container to control the operation of said drain valve to a closed position when said first relay is de-energized and to an open position when said first relay is energized, and means connecting said second relay to an outlet valve for said container to control the operation of said outlet valve to an open position when said second relay is energized and to a closed position when said second relay is de-energized.

6. In an electrical circuit in accordance with claim 5, a support means for electrically insulating material for said electrodes, an internal chamber within said support means, means to exclude said water from said chamber, said electrodes exposed at one respective face thereof to contact by said water and at another respective face thereof to contact by an electrolyte within said chamber, means for introducing predetermined amounts of said electrolyte into said chamber to contact in sequence said electrodes, said electrolyte in contact with said electrodes imposing signals on said base of said transistor means corresponding to the signals which will be imposed thereon when the respective said electrodes are contacted by said water, and means for withdrawing said electrolyte from said chamber.

References Cited in the file of this patent

UNITED STATES PATENTS

| | | |
|---|---|---|
| 2,805,774 | Griswold | Sept. 10, 1957 |
| 2,955,237 | Wyndham | Oct. 4, 1960 |
| 2,959,716 | Gordon | Nov. 8, 1960 |
| 2,984,360 | Smith | May 16, 1961 |

UNITED STATES PATENT OFFICE

CERTIFICATE OF CORRECTION

Patent No. 3,088,592 May 7, 1963

Ray D. Clark

It is hereby certified that error appears in the above numbered patent requiring correction and that the said Letters Patent should read as corrected below.

Column 11, line 62, before "amplifying" insert -- current -- column 12, line 16, before "relay" insert -- first --; column 13, line 12, for "for", first occurrence, read -- of --.

Signed and sealed this 31st day of December 1963.

(SEAL)
Attest:
ERNEST W. SWIDER

EDWIN L. REYNOLDS

Attesting Officer

Acting Commissioner of Patents